(12) United States Patent
Mitchell (10) Patent No.: US 12,049,201 B2
(45) Date of Patent: Jul. 30, 2024

(54) VEHICLE SENSOR CLEANING SYSTEM

(71) Applicant: FORD GLOBAL TECHNOLOGIES, LLC, Dearborn, MI (US)

(72) Inventor: Philip Mitchell, Cranberry Township, PA (US)

(73) Assignee: Ford Global Technologies, LLC, Dearborn, MI (US)

( * ) Notice: Subject to any disclaimer, the term of this patent is extended or adjusted under 35 U.S.C. 154(b) by 323 days.

(21) Appl. No.: 17/690,430

(22) Filed: Mar. 9, 2022

(65) Prior Publication Data

US 2023/0286470 A1     Sep. 14, 2023

(51) Int. Cl.
   *B60S 1/52*     (2006.01)
   *B60S 1/50*     (2006.01)
   *B60W 60/00*    (2020.01)

(52) U.S. Cl.
   CPC .... *B60S 1/52* (2013.01); *B60S 1/50* (2013.01); *B60W 60/001* (2020.02); *B60W 2420/403* (2013.01); *B60W 2420/408* (2024.01)

(58) Field of Classification Search
   CPC ........... B60S 1/52; B60S 1/50; B60W 60/001; B60W 2420/408; B60W 2420/403
   See application file for complete search history.

(56) References Cited

U.S. PATENT DOCUMENTS

| | | | |
|---|---|---|---|
| 6,364,010 B1 | 4/2002 | Richman et al. | |
| 8,550,147 B2 | 10/2013 | Lansinger | |
| 9,911,030 B1 | 3/2018 | Zhu et al. | |
| 10,267,908 B2 | 4/2019 | Luders et al. | |
| 10,268,203 B2 | 4/2019 | Wisniowski | |
| 10,345,437 B1 | 7/2019 | Russell et al. | |
| 10,857,980 B2 | 12/2020 | Rice et al. | |
| 2009/0211605 A1 | 8/2009 | Ahmad | |
| 2012/0000024 A1 | 1/2012 | Layton | |
| 2017/0168291 A1 | 6/2017 | Buss | |

(Continued)

FOREIGN PATENT DOCUMENTS

WO     2020064880 A1     4/2020

OTHER PUBLICATIONS

International Search Report of PCT/US2022/053999 mailed Apr. 21, 2023, 3 pages.

(Continued)

*Primary Examiner* — Vivek D Koppikar
*Assistant Examiner* — Jeffrey R Chalhoub
(74) *Attorney, Agent, or Firm* — Frank A. MacKenzie; Brooks Kushman P.C.

(57) ABSTRACT

Disclosed herein are system, method, and computer program product embodiments for cleaning one or more sensors of an autonomous vehicle (AV) system. For example, the system includes a tank to store a solvent. A heat exchanger is disposed in the tank to transfer heat from a heated fluid to the solvent. A first actuator is provided to enable and disable fluid communication of the heated fluid from a coolant system to the heat exchanger. A nozzle is in fluid communication with the tank to spray the solvent on a sensor of an autonomous vehicle (AV) system to remove debris. A controller is programmed to control the first actuator to enable the fluid communication of the heated fluid to the heat exchanger to increase at least one of a temperature and a pressure of the solvent within the tank.

18 Claims, 5 Drawing Sheets

(56) References Cited

U.S. PATENT DOCUMENTS

| | | | |
|---|---|---|---|
| 2017/0328729 A1 | 11/2017 | Zhu et al. | |
| 2018/0072272 A1* | 3/2018 | Dudar | B60S 1/0844 |
| 2018/0231654 A1 | 8/2018 | Bilik et al. | |
| 2018/0284268 A1 | 10/2018 | McWhirter | |
| 2018/0354469 A1* | 12/2018 | Krishnan | G01S 17/931 |
| 2019/0018416 A1 | 1/2019 | Gassend | |
| 2020/0001331 A1 | 1/2020 | Deane et al. | |
| 2020/0189529 A1* | 6/2020 | Jackson | B60S 1/487 |
| 2020/0379465 A1 | 12/2020 | Adam et al. | |
| 2021/0237531 A1 | 8/2021 | Jackson et al. | |
| 2021/0402961 A1* | 12/2021 | Agrotis | B60S 1/54 |

OTHER PUBLICATIONS

Written Opinion of PCT/US2022/053999 mailed Apr. 21, 2023, 5 pages.

* cited by examiner

VEHICLE SENSOR CLEANING SYSTEM

TECHNICAL FIELD

One or more embodiments relate to a sensor cleaning system for cleaning one or more sensors of an autonomous vehicle.

BACKGROUND

An autonomous vehicle may include a system to monitor its external environment. The system includes sensors that are externally mounted to the autonomous vehicle, for monitoring the external environment. The sensors may accumulate debris, e.g., dirt and salt, which reduce their functionality. Accordingly, the autonomous vehicle may include a mechanism to remove debris from the sensors. The system may also use one or more strategies to determine the location of objects in the external environment based on data from the sensors. The vehicle may control one or more other vehicle systems, e.g., powertrain, braking and steering, based on the locations of the objects.

SUMMARY

In one embodiment, a sensor cleaning system is provided with a tank to store a solvent. A first heat exchanger is disposed in the tank to transfer heat from a heated fluid to the solvent. A first actuator is provided to enable and disable fluid communication of the heated fluid from a coolant system to the first heat exchanger. A nozzle is in fluid communication with the tank to spray the solvent on a sensor of an autonomous vehicle (AV) system to remove debris. A controller is programmed to control the first actuator to enable the fluid communication of the heated fluid to the first heat exchanger to increase at least one of a temperature and a pressure of the solvent within the tank.

In another embodiment, a method is provided for cleaning at least one sensor of an autonomous vehicle (AV) system. Fluid communication of a heated fluid from a coolant system to a first heat exchanger disposed in a tank is enabled to transfer heat to a solvent within the tank without using an electric heater. Fluid communication of the solvent from the tank to a nozzle is enabled to spray the solvent on the at least one sensor of the AV system to remove debris.

In yet another embodiment a non-transitory computer-readable medium is provided with instructions stored thereon that, when executed by at least one computing device, cause the at least one computing device to perform operations, including: enabling fluid communication of a heated fluid from a coolant system to a first heat exchanger disposed in a tank to transfer heat to a solvent within the tank without using an electric heater; and enabling fluid communication of the solvent from the tank to a nozzle to spray the solvent on at least one sensor of an autonomous vehicle (AV) system to remove debris.

BRIEF DESCRIPTION OF THE DRAWINGS

In the drawings, like reference numbers generally indicate identical or similar elements. Additionally, generally, the left-most digit(s) of a reference number identifies the drawing in which the reference number first appears.

DETAILED DESCRIPTION

As required, detailed embodiments are disclosed herein; however, it is to be understood that the disclosed embodiments are merely exemplary and may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present disclosure.

Figure 1:
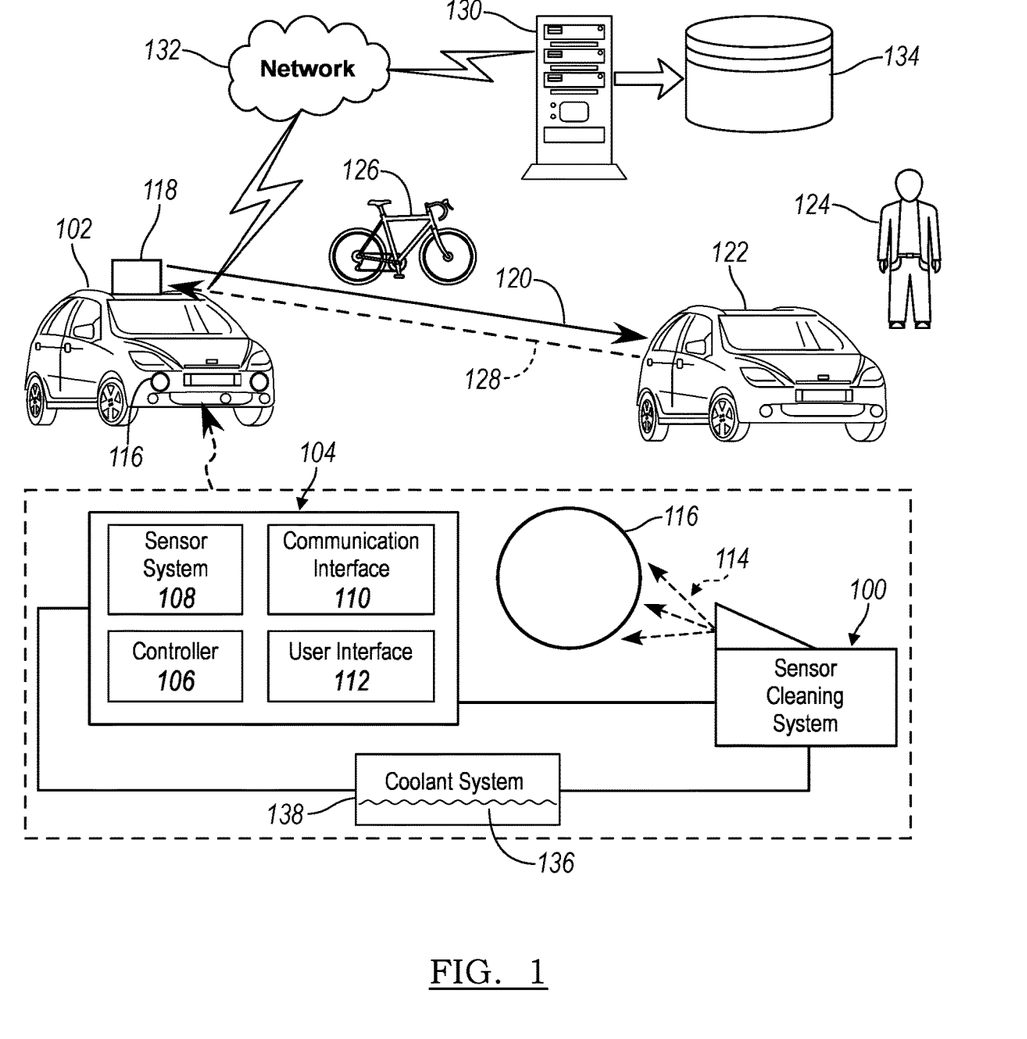
FIG. 1 illustrates an exemplary autonomous vehicle (AV) system and a sensor cleaning system in accordance with aspects of the disclosure.

With reference to FIG. 1, a sensor cleaning system for cleaning one or more sensors of an autonomous vehicle (AV) system is illustrated in accordance with one or more embodiments and generally referenced by numeral 100. The sensor cleaning system 100 is disposed within an AV 102 and cleans components of an AV system 104. The AV system 104 includes a controller 106, and a sensor system 108 that includes one or more cameras and sensors for monitoring an environment external to the AV 102. The AV system 104 also includes a communication interface 110, such as a transceiver, for communicating with other systems and devices, e.g., the sensor cleaning system 100. The AV system 104 also includes a user interface 112 for communicating with a user.

Existing sensor cleaning systems (not shown) may include additional heaters, e.g., electric heaters, to heat cleaning fluid before spraying it on vehicle sensors. However, such additional heaters draw current from the vehicle battery, thereby reducing the efficiency. The sensor cleaning system 100 cleans components of the AV system 104 using a solvent 114 that is heated using waste heat from the AV system 104 or the AV 102, i.e., without using an additional electric heater to maximize efficiency.

The sensor system 108 includes one or more cameras 116 to capture images of the environment external to the AV 102. The cameras 116 may include visible spectrum cameras, infrared cameras, etc. The sensor system 108 also includes a ranging system, such as a light detection and ranging (lidar) assembly 118, that transmits light pulses 120 away from the AV 102. The transmitted light pulses 120 are incident on one or more objects, e.g., a remote vehicle 122, a pedestrian 124, and a cyclist 126, and reflect back toward the sensor system 108 as reflected light pulses 128. The controller 106 processes the reflected light pulses 128 to determine a distance of the objects 122, 124, 126 relative to the AV 102.

The AV system 104 may communicate with a remote computing device 130 over a network 132. The remote computing device 130 may include one or more servers to process one or more processes of the technology described herein. The remote computing device 130 may also communicate with a database 134 over the network 132.

The sensor cleaning system 100 is coupled to a coolant system 138 to receive a heated fluid 136, e.g., coolant, according to one or more embodiments. The coolant system 138 may include a radiator (not shown) for cooling vehicle components, e.g., an engine, a traction motor, a battery, and/or the AV system 104. The AV system 104 includes components that generate heat during operation, e.g., the electronics of the controller 106 and the lidar assembly 118. The coolant system 138 may circulate the heated fluid 136 proximate to the controller 106 and/or lidar assembly 118 to absorb this waste heat. The sensor cleaning system 100 transfers heat from the heated fluid 136 to the solvent 114, and then sprays the heated solvent 114 on the camera 116 to remove debris. In one or more embodiments, the AV system 104 includes the sensor cleaning system 100. The sensor cleaning system 100 uses waste heat from the coolant system 138 to heat and pressurize the solvent 114, rather than using a separate electric heater, to conserve electrical energy of the AV 102.

Figure 2:
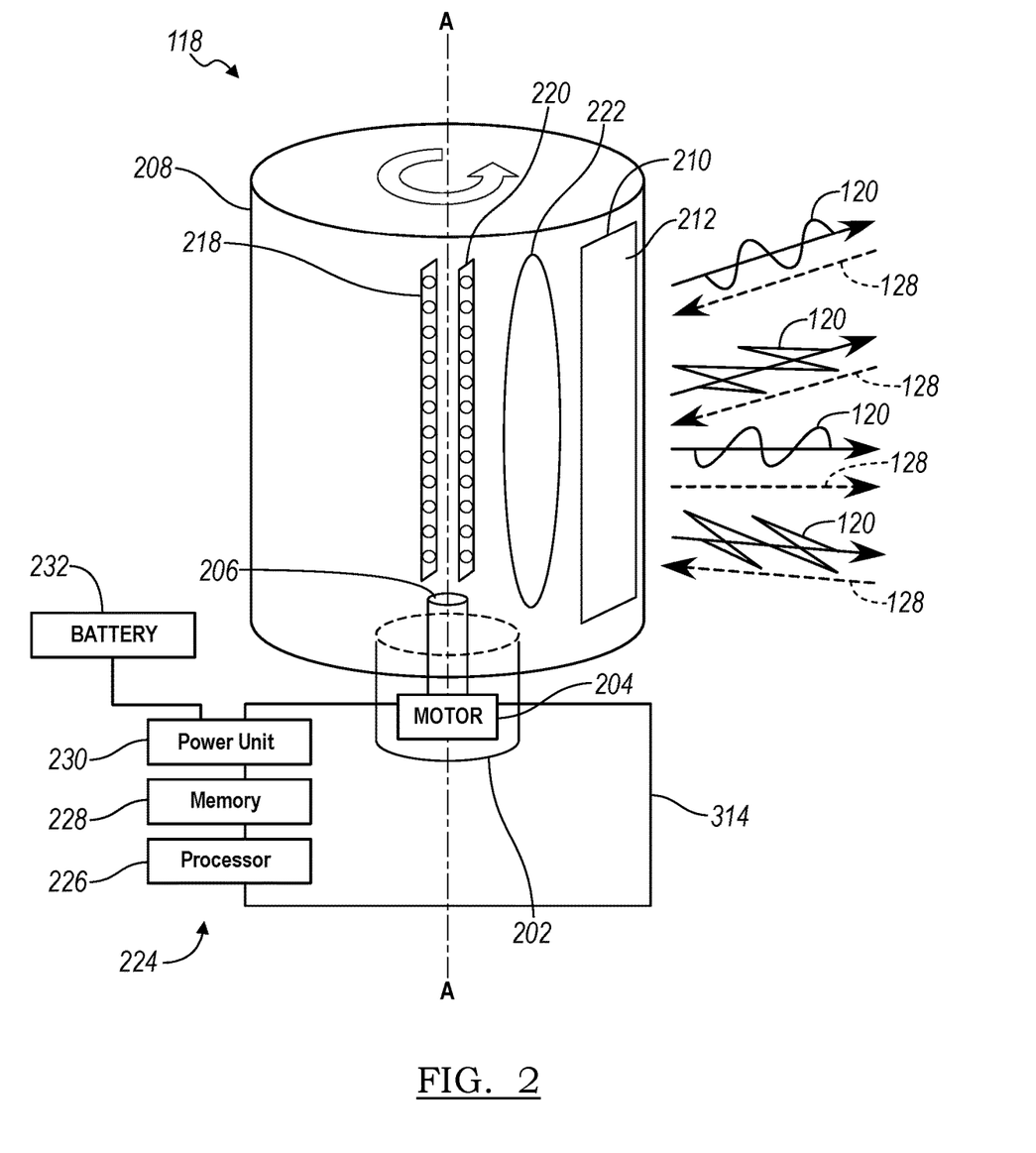
FIG. 2 illustrates an exemplary architecture of a light detection and ranging ("lidar") assembly of the AV system.

FIG. 2 illustrates an exemplary architecture of the lidar assembly 118, in accordance with aspects of the disclosure. The lidar assembly 118 includes a base 202 that is mounted to the AV 102, e.g., to a roof of the AV 102 as shown in FIG. 1. The base 202 includes a motor 204 with a shaft 206 that extends along a longitudinal axis A-A. The lidar assembly 118 also includes a housing 208 that is secured to the shaft 206 and mounted for rotation relative to the base 202 about the axis A-A. The housing 208 includes an opening 210 with an aperture 212 that is secured within the opening 210. The aperture 212 is formed of a material that is transparent to light. Although a single aperture 212 is shown in FIG. 2, the lidar assembly 118 may include multiple apertures 212 in other embodiments (not shown).

The lidar assembly 118 includes one or more emitters 218 for transmitting the light pulses 120 through the aperture 212. The lidar assembly 118 also includes one or more light detectors 220 for receiving the reflected light pulses 128 that pass through the aperture 212. The emitters 218 and the detectors 220 may be stationary, e.g., mounted to the base 202, or dynamic and mounted to the housing 208. The emitters 218 may include laser emitter chips or other light emitting devices and may include any number of individual emitters (e.g., 8 emitters, 64 emitters, or 128 emitters). The emitters 218 may emit light pulses 120 of substantially the same intensity or of varying intensities, and in various waveforms, e.g., sinusoidal, square-wave, and sawtooth. The detectors 220 may include a photodetector or array of photodetectors that are positioned to receive the reflected light pulses 128. The lidar assembly 118 may include one or more optical elements 222 to focus and direct light that is passed through the aperture 212.

The lidar assembly 118 includes a controller 224 with a processor 226 and memory 228 to control various components, e.g., the motor 204, the emitters 218, and the detectors 220. The controller 224 also analyzes the data collected by the detectors 220 to measure characteristics of the light received and generate information about the environment external to the AV 102. The controller 224 may be integrated with another controller, e.g., the controller 106 of the AV system 104. The lidar assembly 118 also includes a power unit 230 that receives electrical power from a vehicle battery 232, and supplies the electrical power to the motor 204, the emitters 218, the detectors 220, and the controller 224.

The sensor system 108 (e.g., the lidar assembly 118 and the cameras 116) may accumulate debris, e.g., dirt or salt, which reduces its functionality. Accordingly, the sensor cleaning system 100 heats and pressurizes the solvent 114 for cleaning one or more sensors of the AV system 104.

Figure 3:
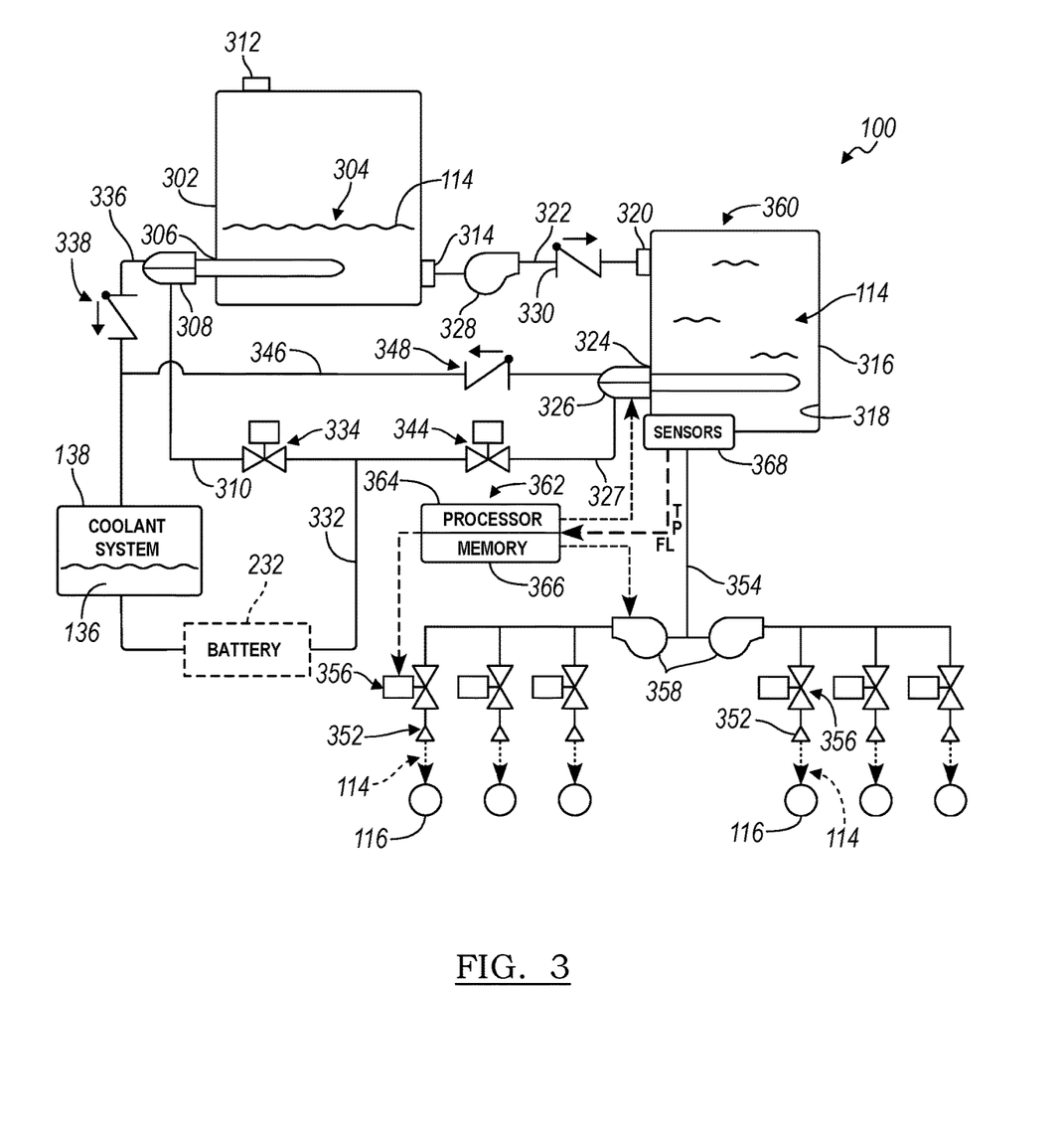
FIG. 3 illustrates an exemplary architecture of the sensor cleaning system. AV system.

With reference to FIG. 3, the sensor cleaning system 100 includes a reservoir 302 that defines a cavity 304 for storing a fluid, such as the solvent 114. The reservoir 302 includes an aperture 306 for receiving a heat exchanger 308. The heat exchanger 308 is connected to the coolant system 138 by a hose 310 to receive the heated fluid 136. As described with reference to FIG. 1, the coolant system 138 circulates the heated fluid 136 proximate to components that generate heat during operation, e.g., the controller 106 and/or lidar assembly 118 to absorb this heat. The heat exchanger 308 extends into the cavity 304 to transfer heat from the heated fluid 136 to the solvent 114. The reservoir 302 includes an inlet 312 for receiving the solvent 114 and an outlet 314.

The sensor cleaning system 100 also includes a tank 316 that is in fluid communication with the reservoir 302 for receiving the solvent 114. The tank 316 defines a cavity 318 for storing the solvent 114. The tank 316 includes an inlet 320 that is coupled to the outlet 314 of the reservoir 302 by one or more fluid lines 322 for receiving the solvent 114. The tank 316 also includes an aperture 324 for receiving a heat exchanger 326. The heat exchanger 326 is connected to the coolant system 138 by a second hose 327 to receive the heated fluid 136. The heat exchanger 326 extends into the cavity 318 to transfer heat from the heated fluid 136 to the solvent 114. In one or more embodiments, the sensor cleaning system 100 also includes a pump 328 that is mounted between the reservoir 302 and the tank 316 to pump the solvent 114 toward the tank 316. The sensor cleaning system 100 may also include a valve 330, such as a check valve, or one-way valve, between the reservoir 302 and the tank 316 to prevent the solvent 114 from flowing from the tank 316 back to the reservoir 302.

The tank 316 and the reservoir 302 are arranged in parallel fluid circuits, according to one or more embodiments. The coolant system 138 includes a main hose 332 that connects to the hose 310 to supply the heated fluid 136 to the heat exchanger 308 of the reservoir 302. The sensor cleaning system 100 includes an actuator 334 that is connected along the hose 310 to enable and disable the flow of the heated fluid 136 to the heat exchanger 308. The sensor cleaning system 100 also includes a return hose 336 that connects the heat exchanger 308 to the coolant system 138. The sensor cleaning system 100 may also include a valve 338, such as a check valve, or one-way valve, between the heat exchanger 308 and the coolant system 138 to prevent the heated fluid 136 from flowing back to the heat exchanger 308. The main hose 332 also connects to the hose 327 to supply the heated fluid 136 to the heat exchanger 326 of the tank 316. The sensor cleaning system 100 also includes a actuator 344 that is connected along the hose 327 to enable and disable the flow of the heated fluid 136 to the heat exchanger 326. The sensor cleaning system 100 also includes a return hose 346 that connects the heat exchanger 326 to the coolant system 138. The sensor cleaning system 100 may also include a valve 348, such as a check valve, or one-way valve, between the heat exchanger 326 and the coolant system 138 to prevent the heated fluid 136 from flowing back to the heat exchanger 326.

The sensor cleaning system 100 includes a series of nozzles 352 that are mounted adjacent to the cameras 116 of the AV system 104 to remove the debris. The illustrated embodiment depicts an AV system 104 with six cameras 116 and a sensor cleaning system 100 with six corresponding nozzles 352. In other embodiments, the sensor cleaning system 100 includes other quantities of cameras 116 and nozzles 352. The nozzles 352 are connected to the tank 316 by fluid lines 354 to receive the solvent 114. The sensor cleaning system 100 also includes one or more actuators 356, to control fluid flow to the nozzles 352. Each actuator 356 includes a solenoid and a valve, according to one or more embodiments. The sensor cleaning system 100 includes one or more pumps 358 that are mounted between the tank 316 and the actuators 356 to increase the pressure of the solvent 114 that is sprayed from the nozzles 352.

The illustrated embodiment depicts one actuator 356 coupled to each nozzle 352 to provide individual control of each nozzle 352. In other embodiments, one actuator 356 may control fluid flow to multiple nozzles 352, e.g., by being connected upstream of the nozzles 352. The sensor cleaning system 100 may also include one or more nozzles that are mounted adjacent to the lidar assembly 118 for cleaning the aperture 212 (not shown). The solvent 114 may be a variety of known substances that can clean dirt, debris, etc. from the sensor system 108, e.g., water, organic solvents, inorganic solvents, glycol mixtures, ethanol mixtures, isopropyl alcohol mixtures, ammonia mixtures, or any other washer fluids.

The sensor cleaning system 100 increases the heat and pressure of the solvent 114 to improve cleaning, without adding additional electric heaters. The sensor cleaning system 100 is coupled to the coolant system 138 to receive a heated fluid 136 for heating the solvent 114. The heated fluid 136 is provided to the heat exchanger 326 of the tank 316 before it is provided to the heat exchanger 308 of the reservoir to prioritize heating the solvent 114 in the tank 316. The coolant system 138 cools components of the AV system 104 and/or the AV 102, e.g., the vehicle battery 232. The sensor cleaning system 100 provides a sealed region 360 between the valve 330 and the actuators 356. Heating the solvent 114 causes expansion and increased pressure within the sealed region 360.

The sensor cleaning system 100 includes a controller 362 with a processor 364 and memory 366 to manage the temperature and pressure of the solvent 114. The sensor cleaning system 100 includes one or more sensors 368 for monitoring the temperature, pressure, and fluid level of the solvent 114 within the tank 316 and providing corresponding temperature (T), pressure (P) and fluid level (FL) signals to the controller 362. The controller 362 compares these signals to predetermined data and then provides control signals to the pumps 328, 358, and the actuators 334, 344, 356.

Although the controller 362 is described as a single controller, it may contain multiple controllers, or may be embodied as software code within one or more other controllers, e.g., the controller 106 of the AV system and/or the controller 224 of the lidar assembly 118. The processor 364 may include any number of microprocessors, ASICs, ICs, memory (e.g., FLASH, ROM, RAM, EPROM and/or EEPROM) and software code to co-act with one another to perform a series of operations. Such hardware and/or software may be grouped together in assemblies to perform certain functions. Any one or more of the controllers or devices described herein include computer executable instructions that may be compiled or interpreted from computer programs created using a variety of programming languages and/or technologies. The memory 366, or non-transitory computer-readable storage medium, is capable of executing instructions of a software program. The memory may be, but is not limited to, an electronic storage device, a magnetic storage device, an optical storage device, an electromagnetic storage device, a semi-conductor storage device, or any suitable combination thereof. In general, the processor receives instructions, for example from the memory, a computer-readable medium, or the like, and executes the instructions. The controller 362, also includes predetermined data, or "look up tables" that are stored within memory, according to one or more embodiments.

Figure 4:
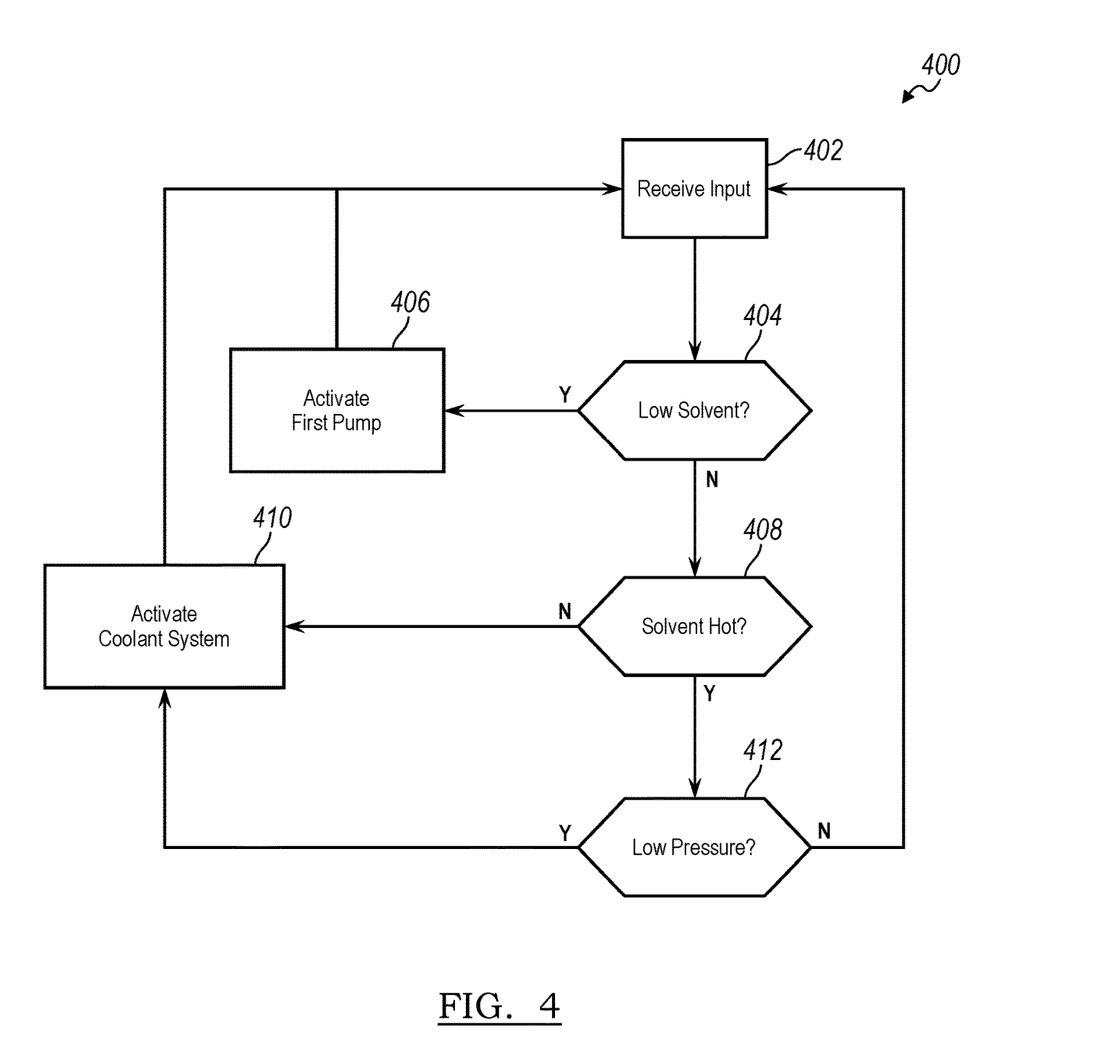
FIG. 4 is a flow chart illustrating a method for cleaning one or more sensors of the AV system.

With reference to FIG. 4, a flow chart depicting a method for cleaning one or more sensors of the AV system 104 is illustrated in accordance with one or more embodiments and is generally referenced by numeral 400. The method 400 is implemented using software code that is executed by the controller 362 of the sensor cleaning system 100, according to one or more embodiments. While the flowchart is illustrated with a number of sequential steps, one or more steps may be omitted and/or executed in another manner without deviating from the scope and contemplation of the present disclosure.

At step 402, the controller 362 receives input signals, e.g., the temperature (T), pressure (P) and fluid level (FL) signals. At step 404, the controller 362 determines if the level of solvent 114 in the tank 316 is low. For example, the controller 362 may compare the fluid level (FL) signal to a predetermined fluid threshold level for the tank 316. If the solvent 114 is low, the controller 362 proceeds to step 406 and activates the pump 328 to pump solvent 114 from the reservoir 302 to the tank 316, and returns to step 404. After the controller 362 determines that there is sufficient solvent 114 in the tank 316, i.e., not low, it proceeds to step 408.

At step 408, the controller 362 determines if the solvent 114 is hot. For example, the controller 362 may compare the temperature signal (T) to a predetermined temperature threshold. If the solvent 114 is not hot, the controller 362 may communicate with the actuator 344 at step 410 to enable flow of the heated fluid 136 to the heat exchanger 326 to heat the solvent 114 in the tank 316. After the controller 362 determines that the solvent 114 is hot, it proceeds to step 412.

At step 412, the controller 362 determines if the pressure of the solvent 114 is low. For example, the controller 362 may compare the pressure signal (P) to a predetermined pressure threshold. If the pressure of the solvent 114 is low, the controller 362 may communicate with the actuator 344 at step 410 to enable flow of the heated fluid 136 to the heat exchanger 326 to heat the solvent 114 in the tank 316, thereby increasing the pressure within the sealed region 360. After the controller 362 determines that the pressure of the solvent 114 is sufficient, i.e., not low, it returns to step 402.

Figure 5:
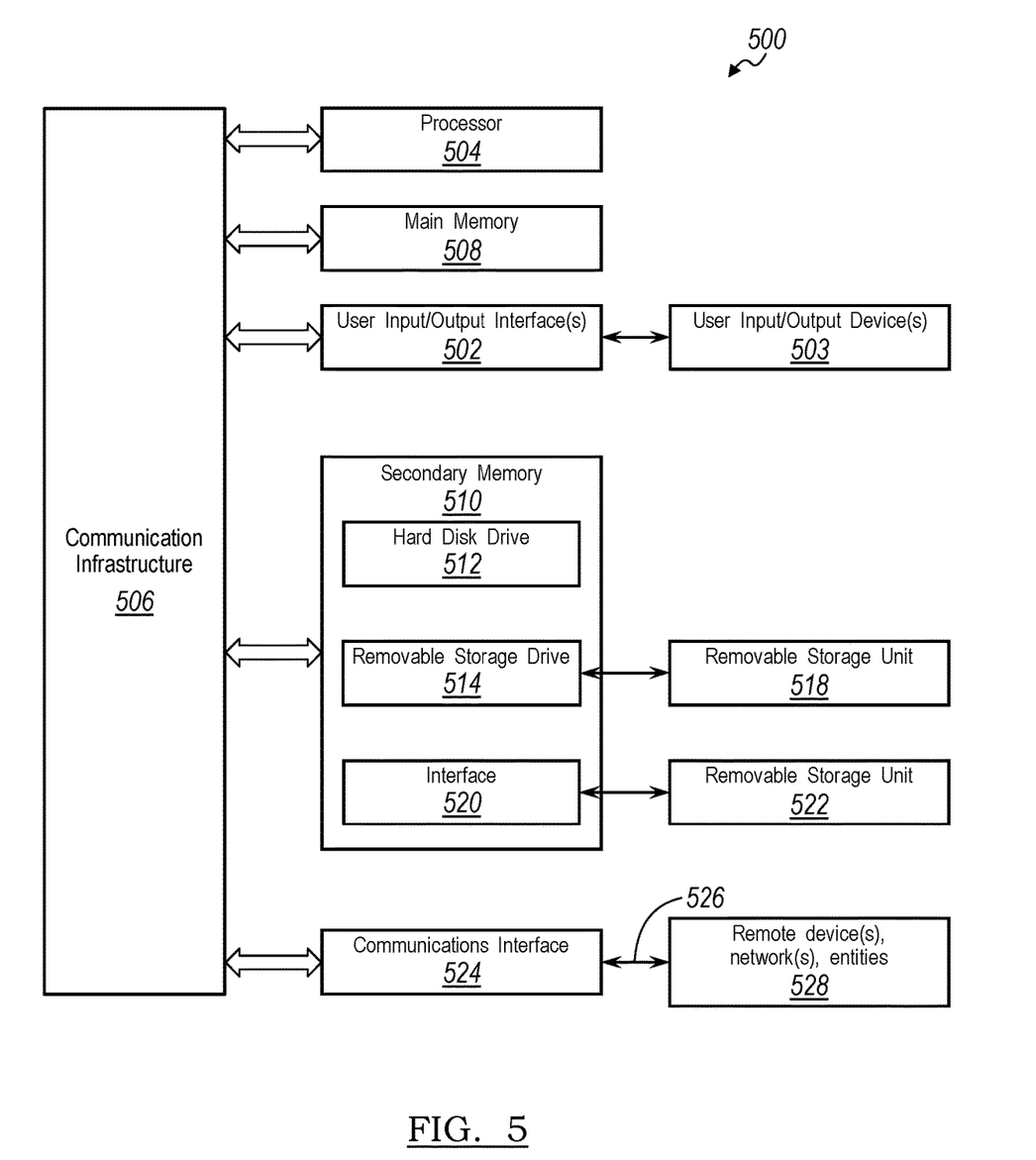
FIG. 5 is a detailed schematic diagram of an example computer system for implementing various embodiments.

The system and method for cleaning one or more sensors of the AV system 104 may be implemented using one or more controllers, such as computer system 500 shown in FIG. 5. The computer system 500 may be any computer capable of performing the functions described herein. The computer system 500 also includes user input/output interface(s) 502 and user input/output device(s) 503, such as buttons, monitors, keyboards, pointing devices, etc.

The computer system 500 includes one or more processors (also called central processing units, or CPUs), such as a processor 504. The processor 504 is connected to a communication infrastructure or bus 506. The processor 504 may be a graphics processing unit (GPU), e.g., a specialized electronic circuit designed to process mathematically intensive applications, with a parallel structure for parallel processing large blocks of data, such as mathematically intensive data common to computer graphics applications, images, videos, etc.

The computer system 500 also includes a main memory 508, such as random-access memory (RAM), that includes one or more levels of cache and stored control logic (i.e., computer software) and/or data. The computer system 500 may also include one or more secondary storage devices or secondary memory 510, e.g., a hard disk drive 512; and/or a removable storage device 514 that may interact with a removable storage unit 518. The removable storage device 514 and the removable storage unit 518 may be a floppy disk drive, a magnetic tape drive, a compact disk drive, an optical storage device, tape backup device, and/or any other storage device/drive.

The secondary memory 510 may include other means, instrumentalities or other approaches for allowing computer programs and/or other instructions and/or data to be accessed by computer system 500, e.g., an interface 520 and a removable storage unit 522, e.g., a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

The computer system 500 may further include a network or communication interface 524 to communicate and interact with any combination of remote devices, remote networks, remote entities, etc. (individually and collectively referenced by reference number 528). For example, the communication interface 524 may allow the computer system 500 to communicate with remote devices 528 over a communication path 526, which may be wired and/or wireless, and which may include any combination of LANs, WANs, the Internet, etc. The control logic and/or data may be transmitted to and from computer system 500 via communication path 526.

In an embodiment, a tangible, non-transitory apparatus or article of manufacture comprising a tangible, non-transitory computer useable or readable medium having control logic (software) stored thereon is also referred to herein as a computer program product or program storage device. This includes, but is not limited to, the computer system 500, the main memory 508, the secondary memory 510, and the removable storage units 518 and 522, as well as tangible articles of manufacture embodying any combination of the foregoing. Such control logic, when executed by one or more data processing devices (such as the computer system 500), causes such data processing devices to operate as described herein.

The term "vehicle" refers to any moving form of conveyance that is capable of carrying either one or more human occupants and/or cargo and is powered by any form of energy. The term "vehicle" includes, but is not limited to, cars, trucks, vans, trains, autonomous vehicles, aircraft, aerial drones and the like. An "autonomous vehicle" (or "AV") is a vehicle having a processor, programming instructions and drivetrain components that are controllable by the processor without requiring a human operator. An autonomous vehicle may be fully autonomous in that it does not require a human operator for most or all driving conditions and functions, or it may be semi-autonomous in that a human operator may be required in certain conditions or for certain operations, or that a human operator may override the vehicle's autonomous system and may take control of the vehicle. Notably, the present solution is being described herein in the context of an autonomous vehicle. However, the present solution is not limited to autonomous vehicle applications. The present solution may be used in other applications such as robotic applications, radar system applications, metric applications, and/or system performance applications.

Based on the teachings contained in this disclosure, it will be apparent to persons skilled in the relevant art(s) how to make and use embodiments of this disclosure using data processing devices, computer systems and/or computer architectures other than that shown in FIG. 5. In particular, embodiments can operate with software, hardware, and/or operating system implementations other than those described herein.

It is to be appreciated that the Detailed Description section, and not any other section, is intended to be used to interpret the claims. Other sections can set forth one or more but not all exemplary embodiments as contemplated by the inventor(s), and thus, are not intended to limit this disclosure or the appended claims in any way.

While this disclosure describes exemplary embodiments for exemplary fields and applications, it should be understood that the disclosure is not limited thereto. Other embodiments and modifications thereto are possible, and are within the scope and spirit of this disclosure. For example, and without limiting the generality of this paragraph, embodiments are not limited to the software, hardware, firmware, and/or entities illustrated in the figures and/or described herein. Further, embodiments (whether or not explicitly described herein) have significant utility to fields and applications beyond the examples described herein.

Embodiments have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. Also, alternative embodiments can perform functional blocks, steps, operations, methods, etc. using orderings different than those described herein.

References herein to "one embodiment," "an embodiment," "an example embodiment," or similar phrases, indicate that the embodiment described can include a particular feature, structure, or characteristic, but every embodiment can not necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such feature, structure, or characteristic into other embodiments whether or not explicitly mentioned or described herein. Additionally, some embodiments can be described using the expression "coupled" and "connected" along with their derivatives. These terms are not necessarily intended as synonyms for each other. For example, some embodiments can be described using the terms "connected" and/or "coupled" to indicate that two or more elements are in direct physical or electrical contact with each other. The term "coupled," however, can also mean that two or more elements are not in direct contact with each other, but yet still co-operate or interact with each other. The breadth and scope of this disclosure should not be limited by any of the above-described exemplary embodiments, but should be defined only in accordance with the following claims and their equivalents.

While exemplary embodiments are described above, it is not intended that these embodiments describe all possible forms of the disclosure. Rather, the words used in the specification are words of description rather than limitation, and it is understood that various changes may be made without departing from the spirit and scope of the disclosure. Additionally, the features of various implementing embodiments may be combined to form further embodiments.

What is claimed is:

1. A sensor cleaning system comprising:
 a tank to store a solvent;

a reservoir in fluid communication with the tank;
a valve disposed between the reservoir and the tank to permit the solvent to flow in one direction from the reservoir to the tank;
a first heat exchanger disposed in the tank to transfer heat from a heated fluid to the solvent;
a first actuator to enable and disable fluid communication of the heated fluid from a coolant system to the first heat exchanger;
a nozzle in fluid communication with the tank to spray the solvent on a sensor of an autonomous vehicle (AV) system to remove debris;
a third actuator disposed between the reservoir and the nozzle to enable and disable fluid communication to the nozzle, wherein the third actuator and the valve collectively define a sealed region when fluid communication is disabled, and wherein heating the solvent in the tank increased pressure within the sealed region; and
a controller programmed to control the first actuator to enable the fluid communication of the heated fluid to the first heat exchanger to increase at least one of a temperature and a pressure of the solvent within the tank.

2. The sensor cleaning system of claim 1, wherein the controller is further programmed to control the first actuator to enable the fluid communication of the heated fluid to the first heat exchanger in response to the temperature of the solvent being less than a threshold temperature.

3. The sensor cleaning system of claim 1, wherein the controller is further programmed to control the first actuator to enable the fluid communication of the heated fluid to the first heat exchanger in response to the pressure of the solvent being less than a threshold pressure.

4. The sensor cleaning system of claim 1 further comprising a pump disposed between the reservoir and the tank; and
wherein the controller is further programmed to activate the pump to provide the solvent to the tank in response to a fluid level of the solvent within the tank being less than a threshold fluid level.

5. The sensor cleaning system of claim 1 further comprising:
a second heat exchanger disposed in the reservoir to transfer heat from the heated fluid to the solvent; and
a second actuator to enable and disable fluid communication of the heated fluid from the coolant system to the second heat exchanger.

6. The sensor cleaning system of claim 5, wherein the controller is further programmed to prioritize heating the solvent in the tank, over heating the solvent in the reservoir, by controlling the first actuator to enable the fluid communication of the heated fluid to the first heat exchanger, and controlling the second actuator to disable fluid communication of the heated fluid to the second heat exchanger.

7. The sensor cleaning system of claim 1, wherein the controller is further programmed to control the third actuator to enable fluid communication to the nozzle to spray the solvent on the sensor to remove debris.

8. The sensor cleaning system of claim 1, wherein the nozzle further comprises a series of nozzles and the sensor further comprises a series of cameras, wherein each nozzle of the series of nozzles is adapted to mount proximate to a camera of the series of cameras to remove debris.

9. A method for cleaning at least one sensor of an autonomous vehicle (AV) system, the method comprising:
enabling fluid communication of a heated fluid from a coolant system to a first heat exchanger disposed in a tank to transfer heat to a solvent within the tank without using an electric heater;
enabling fluid communication of the solvent from the tank to a nozzle to spray the solvent on the at least one sensor of the AV system to remove debris;
controlling a third actuator disposed between a reservoir and the nozzle to enable and disable fluid communication to the nozzle, wherein the third actuator and a valve collectively define a sealed region when fluid communication is disabled, and
heating the solvent in the tank to increase pressure within the sealed region.

10. The method of claim 9 further comprising:
controlling a first actuator to enable the fluid communication of the heated fluid to the first heat exchanger in response to at least one of a temperature of the solvent being less than a threshold temperature, and a pressure of the solvent being less than a threshold pressure.

11. The method of claim 9 further comprising:
activating a pump to provide the solvent to the tank in response to a level of the solvent within the tank being less than a threshold fluid level.

12. The method of claim 9 further comprising:
enabling fluid communication of the heated fluid from the coolant system to a second heat exchanger disposed in a reservoir to transfer heat to the solvent within the reservoir.

13. The method of claim 12 further comprising:
prioritizing heating the solvent in the tank, over heating the solvent in the reservoir, by enabling fluid communication of the heated fluid to the first heat exchanger and disabling fluid communication of the heated fluid to the second heat ex changer.

14. A non-transitory computer-readable medium having instructions stored thereon that, when executed by at least one computing device, cause the at least one computing device to perform operations comprising:
enabling fluid communication of a heated fluid from a coolant system to a first heat exchanger disposed in a tank to transfer heat to a solvent within the tank without using an electric heater;
enabling fluid communication of the solvent from the tank to a nozzle to spray the solvent on at least one sensor of an autonomous vehicle (AV) system to remove debris;
controlling a third actuator disposed between a reservoir and the nozzle to enable and disable fluid communication to the nozzle, wherein the third actuator and a valve collectively define a sealed region when fluid communication is disabled, and
heating the solvent in the tank to increase pressure within the sealed region.

15. The non-transitory computer-readable medium of claim 14, wherein the operations further comprise:
controlling a first actuator to enable the fluid communication of the heated fluid to the first heat exchanger in response to at least one of a temperature of the solvent being less than a threshold temperature, and a pressure of the solvent being less than a threshold pressure.

16. The non-transitory computer-readable medium of claim 14, wherein the operations further comprise:
activating a pump coupled to a reservoir in fluid communication with the tank to provide the solvent to the tank in response to a level of the solvent within the tank being less than a threshold fluid level.

17. The non-transitory computer-readable medium of claim 14, wherein the operations further comprise:
  enabling fluid communication of the heated fluid from the coolant system to a second heat exchanger disposed in a reservoir to transfer heat to the solvent within the reservoir; and
  prioritizing heating the solvent in the tank, over heating the solvent in the reservoir, by enabling fluid communication of the heated fluid to the first heat exchanger and disabling fluid communication of the heated fluid to the second heat exchanger.

18. A sensor cleaning system comprising:
  a tank to store a solvent;
  a first heat exchanger disposed in the tank to transfer heat from a heated fluid to the solvent;
  a first actuator to enable and disable fluid communication of the heated fluid from a coolant system to the first heat exchanger;
  a nozzle in fluid communication with the tank to spray the solvent on a sensor of an autonomous vehicle (AV) system to remove debris; and
  a non-transitory computer-readable medium having instructions stored thereon that, when executed by at least one computing device, cause the at least one computing device to perform operations comprising:
    enabling fluid communication of a heated fluid from a coolant system to a first heat exchanger disposed in a tank to transfer heat to a solvent within the tank without using an electric heater;
    enabling fluid communication of the solvent from the tank to a nozzle to spray the solvent on the at least one sensor of an autonomous vehicle (AV) system to remove debris; and
    controlling a third actuator disposed between a reservoir and the nozzle to enable and disable fluid communication to the nozzle, wherein the third actuator and a valve collectively define a sealed region when fluid communication is disabled, and wherein heating the solvent in the tank to increase pressure within the sealed region.

\* \* \* \* \*